Patented June 28, 1932

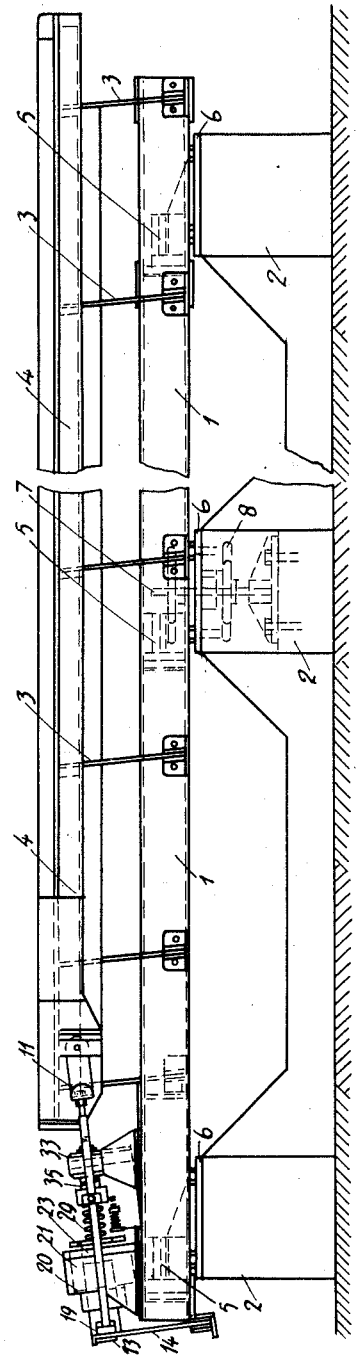

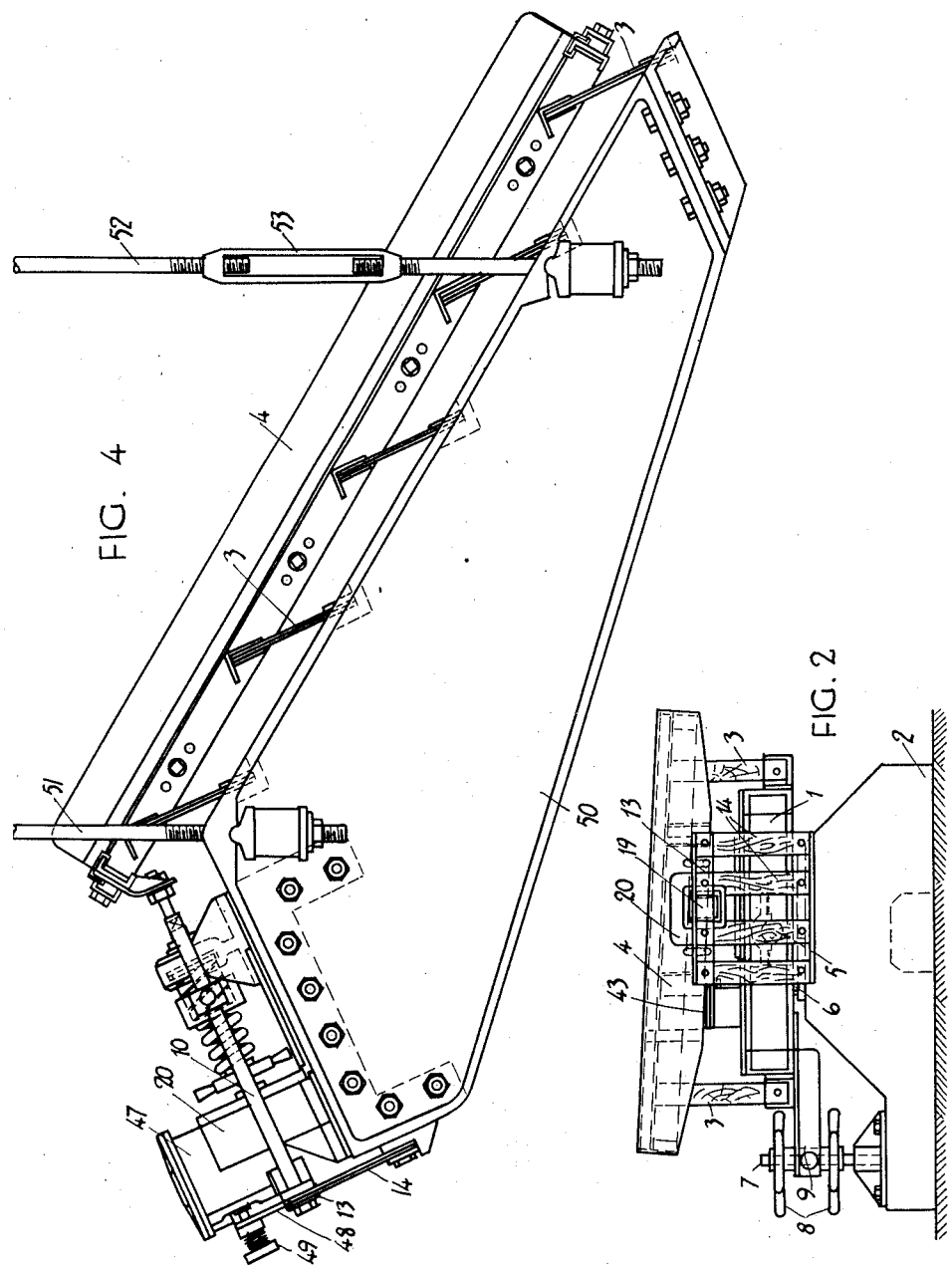

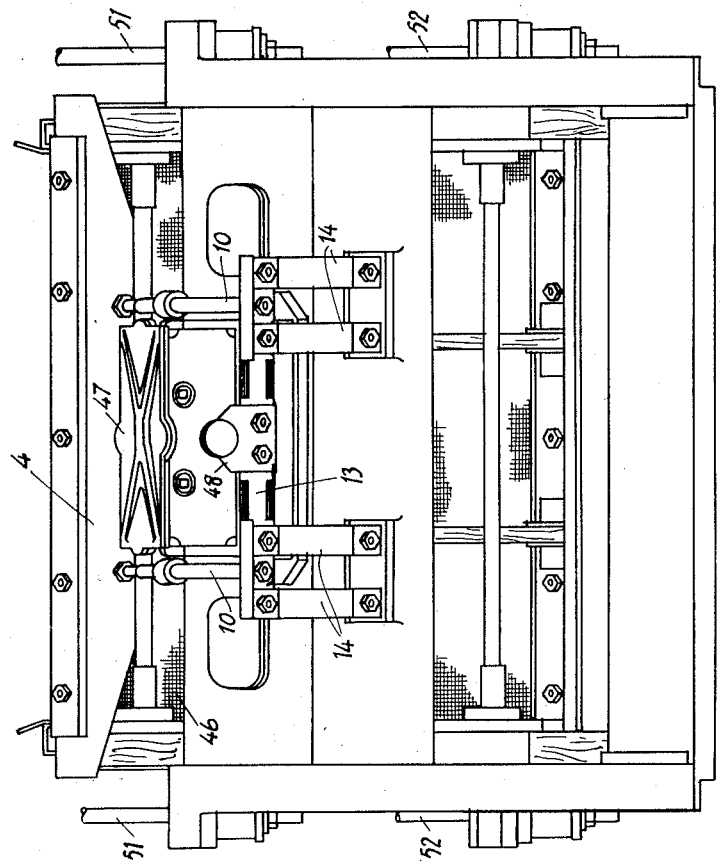

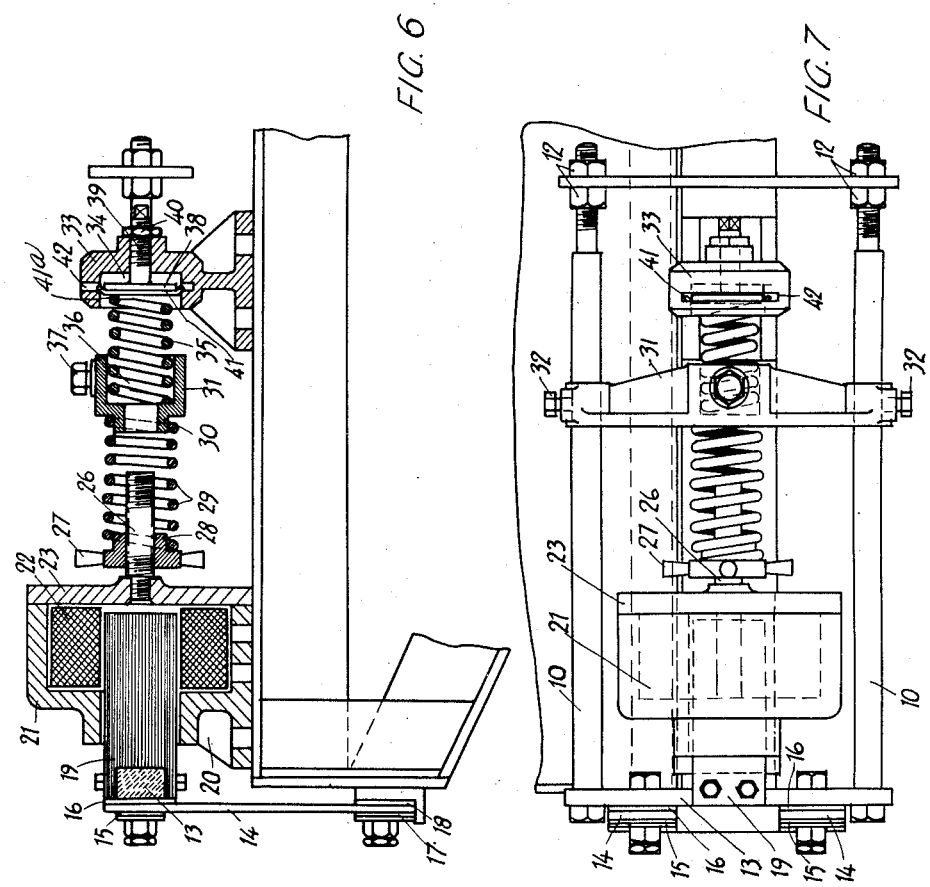

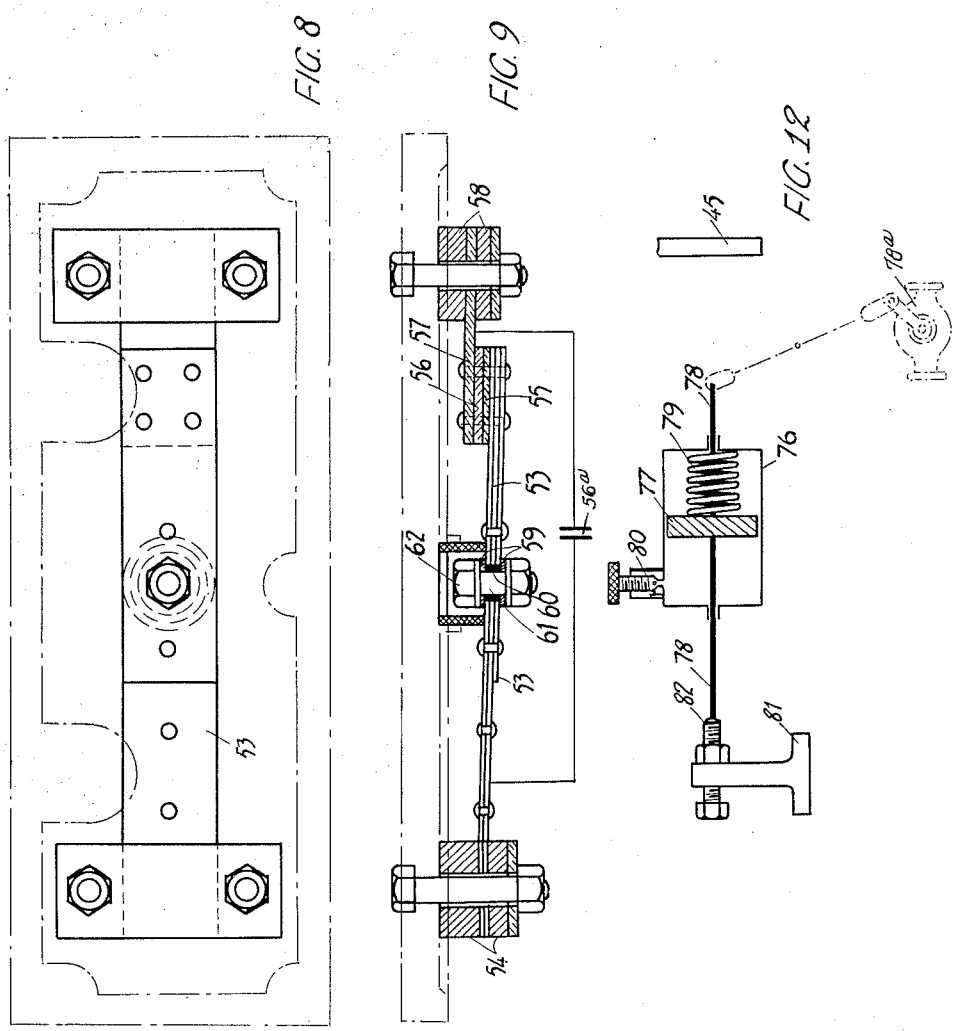

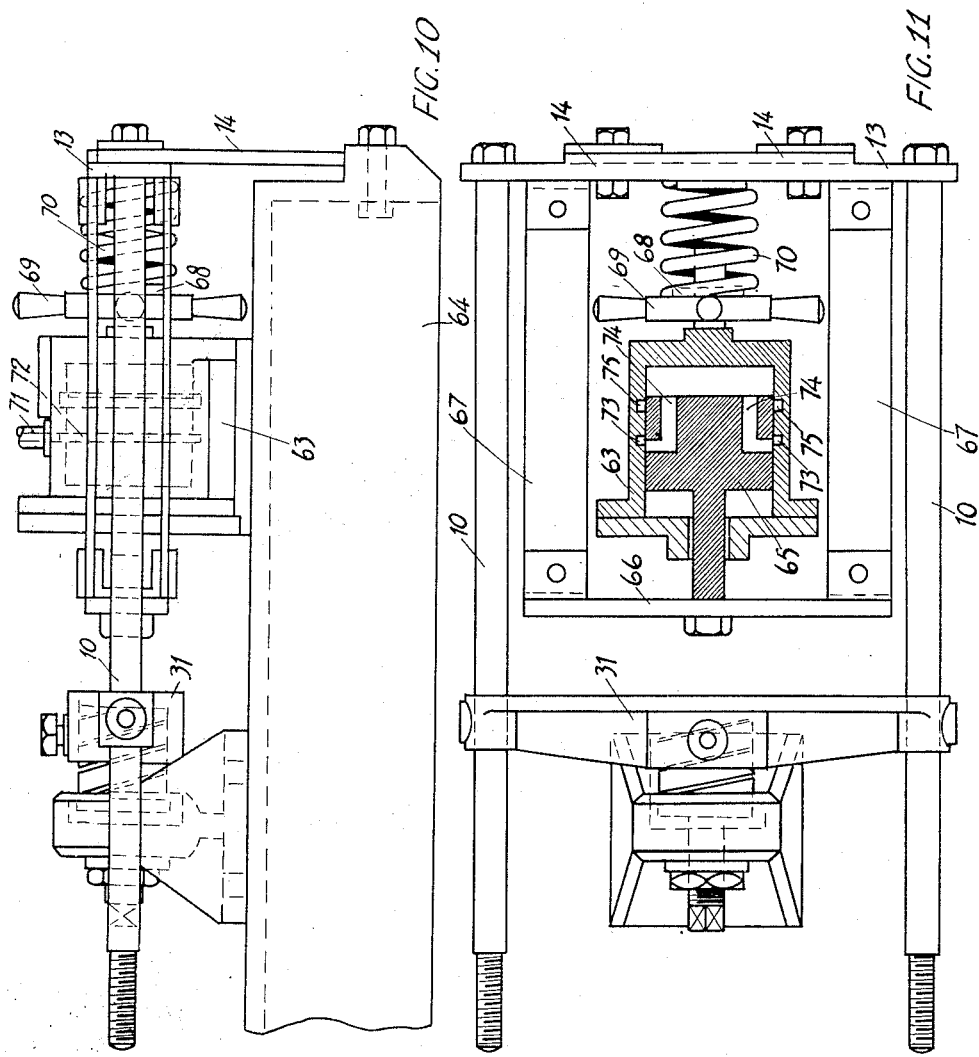

1,864,863

UNITED STATES PATENT OFFICE

JOSEPH WILLIAM SHERWEN, OF ERITH, ENGLAND

APPARATUS FOR VIBRATING SCREENS, SHAKING TABLES, AND OTHER APPARATUS

Application filed March 31, 1931, Serial No. 526,669, and in Great Britain April 15, 1930.

This invention relates to apparatus for vibrating screens, concentrating tables, and other apparatus having a vibratable table or the equivalent on to which is fed material to be handled or treated. Apparatus of the kind will hereinafter be referred to for the sake of brevity, as "vibratile apparatus". One object of the invention is to provide apparatus of the type specified which is so arranged that the power supplied to the table increases and decreases automatically as the load on the table is increased or decreased.

When the weight of material on a table varies, a change is produced in the dynamical and mechanical properties of the table: thus, where the table is under elastic forces tending to maintain it in a central position, the natural period of vibration of the table changes with the load on the table, and, similarly, if the table is carried by resilient supports, the attitude of the table on the supports varies with variations in the quantity of material on the table. (The dynamical and physical properties of the table which are affected by the load on the table will hereinafter be referred to simply as "the properties" of the table and load, for the sake of brevity.) Apparatus in accordance with the present invention, comprises power means for reciprocating the table, and regulating means for controlling the power means, which regulating means is actuated in dependence upon "the properties" of the table. In this arrangement, the supply of power to the power means may be made periodic or intermittent, and the regulation may be effected by varying the fraction of the period during which power is supplied.

The regulation of the power supply may be controlled either by an inertia governor, or by so arranging the resilient supports that their initial deflection depends upon the load on the table, this variation in the initial position of the table producing a variation in the length of that part of the stroke during which power is supplied to the power means. With either form of regulation, the arrangement is such that an increase in the load on the table causes power to be supplied to the power means during a larger fraction of the stroke of the table.

Arrangements in accordance with the invention will now be described by way of example with reference to the accompanying drawings in which Figure 1 shows a side elevation, Figure 2 an end elevation and Figure 3 a plan of a concentrating table in accordance with the invention. Figures 4 and 5 show a side elevation and an end elevation respectively, of a screen. Figures 6 and 7 show in greater detail a side elevation and a plan of the solenoid arrangement for vibrating the table, and Figures 8 and 9 show the switching means, (in elevation and in plan, respectively) which are incorporated in the arrangement in accordance with Figures 1 to 5. Figures 10 and 11 show, in elevation and in plan, a form of pneumatic motor which may be used in place of a solenoid for vibrating the table. Figure 12 shows an inertia governor for regulating the performance of the apparatus in accordance with the load on the table.

In the concentrating table shown in Figures 1, 2 and 3, a frame member 1 is mounted on concrete blocks 2, and carries inclined spring leaves 3 on the upper ends of which is carried the table 4. The frame member 1 is mounted on the blocks 2 by means of bearings 5 carried by sole plates 6, and a levelling screw 7 is provided carrying hand wheels 8 which engage an arm 9 connected to the frame 1, whereby the slope of the table may be adjusted by tilting it about a longitudinal axis passing through the bearings 5.

On the frame member 1 is also mounted an electromagnetic shaker, which is also shown in greater detail in Figures 6 and 7. The shaker comprises rods 10 (which are connected, as shown in Figures 1 and 3, to the table 4 by the strap 11), provided with adjusting nuts 12 at the end at which they are connected with the table to be shaken (not shown in Figure 6) and carrying at the other end a yoke 13 which is supported by spring leaves 14 from the frame member 1, the leaves 14 being insulated at 15, 16, 17 and 18 (see Figures 6 and 7) from the yoke 13 and the frame 1. The yoke 13 carries the laminated core 19 of the solenoid 20, which comprises a magnetic body member 21, an energizing winding 22, and a magnetic cover plate 23. It will be seen that the face 24 of the core 19 is in close proximity to the cover 23, so as to reduce the reluctance of the magnetic circuit as much as possible, but the clearance 25 must, of course, be sufficient to permit the oscillatory motion of the core 19. The body member 21 is rigidly mounted on the frame 1, and carries an adjusting screw 26 on which works a hand wheel 27 having a boss 28 which is embraced by one end of a compression spring 29, the other end of which embraces a boss 30 on a second yoke 31 which is rigidly mounted on the rods 10, set screws 32 being provided, so that the position of the yoke 31 on the rods 10 may be adjusted. Co-axial with the solenoid 20, a bracket 33 is rigidly mounted on the frame 1, and in the face of the bracket 33 is a recess 34 into which enters a spring 35 which is carried in a recess 36 in the yoke 31 (and is clamped thereby a set screw 37). Within the recess 34 is the head 38 of a screw 39 (carrying a lock nut 40), the head 38 being covered by a facing 41 of some hardened material, which receives the impacts of the spring 35, an aperture 42, being provided for the introduction of the facing material 41.

It will be seen that with this arrangement, the frequency of the natural vibration of the table depends on the load on it, and on the stiffness of the springs 3, 14 and 29, and on the width of the clearance 41a between the end of the spring 35 and the facing 41. The natural frequency may accordingly be adjusted by varying the positions of the hand wheel 27 and the screw 38.

In order to control the supply of current to the solenoid 20, in the arrangement in accordance with Figures 1 to 3, a switch 43 is provided which is actuated by a tappet member 44 which is carried by one of the rods 10.

The operation of the apparatus is as follows. Supposing the table to be in the position shown in Figure 1, when the power supply to the solenoid 20 is switched on, the core 19 is attracted and drawn into the solenoid, carrying the yoke 13, rods 10, member 11 and table 4 with it. When the table 4 has travelled a determinate distance towards the right (in Figure 1), the tappet 44 strikes an arm 45 controlling the contacts of the switch 43, causing them to open and cut off the supply of power to the solenoid. Owing to its momentum, the table 4 continues to travel further to the right, until its momentum is absorbed by the compression of springs 29 and 35 and the flexure of the leaves 3 and 14. The table now swings towards the left until the tappet 44 releases the arm 45 and allows the switch contacts to reclose. The pull of the solenoid, and the restoring force of the spring 29 and the leaves 3 and 14, now brings the table to rest, and the cycle is repeated.

Now it will be seen that the power is supplied to the solenoid 20 only so long as the tappet 44 is out of contact with the arm 45, and the power supplied to the solenoid depends on the fraction that the time during which power is supplied, forms of the time of one complete period of oscillation: or, which is the same thing, the power supplied depends on the fraction that the part of the stroke when the tappet 44 and arm 45 are out of contact, forms of the total stroke. Now, owing to the fact that the leaves 3 are inclined to the vertical, their initial static deflection (e. g. their deflection when not vibrating), and thus the mean position of the table, depends on the load on the table: as the load on the table increases, the increasing deflection of the leaves causes the table to move towards the left (in Figure 1). Thus, the distance between the left hand extremity of the stroke of the table, and the position of the table at which the tappet 44 contacts with the arm 45, increases as the load on the table increases: and, therefore, since the power supplied to the solenoid increases with an increase in the length of stroke which is made before the tappet 44 strikes arm 45, it will be seen that the power supplied to the table increases automatically as the load on the table increases.

In the case of the screen shown in Figures 4 and 5 the table 4, comprising the screen cloth 46, is once more supported on inclined spring leaves 3, which may conveniently be made of hickory, and is actuated by a solenoid 20 (which is at a suitable angle to the table 4, as shown) through rods 10, the rear ends of the latter being once more supported by spring leaves 14. In the present case, the arrangement of the switch-box 47 is slightly different, the switch being mounted between the rods 10, and being operated by a tappet 48 carried by the yoke 13. The tappet 48 is provided with a striker 49, which is screw-threaded (Fig. 4) so that the position thereof can be adjusted with respect of the tappet, so as to vary the point of its stroke at which the switch contacts (see Figs. 8 and 9) are caused to open.

In the present case, instead of mounting the apparatus upon a concrete block foundation, as in the case of the concentrating table shown in Figures 1 to 3, the leaves 3 are mounted on a massive base or frame member 50, which is pendulously supported by the rods 51 and 52, which are in turn carried by a suitable overhead frame work (not shown). The front rods 52 are provided with turnbuckles 53 so that the inclination of the table may be adjusted at will. With this arrangement, substantially none of the momentum of the reciprocating system is communicated to the surroundings; but it will be understood that the weight of the base 50 should be considerably greater than the combined weights of the table 4 and the load it has to carry, so that the velocity of reciprocation to the base is very small in comparison with that of the table and load, as otherwise the efficiency of the table will be adversely affected.

The switch, which is shown in detail in Figures 8 and 9, comprises a laminated resilient arm 53 clamped between insulating blocks 54, and carrying at its free end the contact 55, which co-acts with the fixed contact 56 (these contacts may conveniently be made of platenoid) carried by the short fixed arm 57 which is likewise clamped between the insulating blocks 58. In the centre of the arm 53, but insulated from it by washers 59 and a bush 60, is a bolt 61, the head of which has a hardened face 62. The tappet or striker carried by the table, for instance, striker 49, Fig. 4, or some member operated by this tappet or striker, is arranged to strike the hardened face 62, thus causing the switch to open. It will be seen that with this arrangement, the multiplying action of the lever 53 causes the contacts 55 and 56 to separate with a velocity greater than that of the member striking the face 62, this rapid break assisting in diminishing sparking. In order further to suppress sparking, a condenser 56a is shunted across the switch contacts; the size of this condenser must be determined by trial, as it depends on the size of the solenoid, but condensers of the order of six microfarads have been found to be successful in a number of cases.

Figures 10 and 11 show a form of pneumatic motor which might be used for driving apparatus in accordance with the present invention: for example, this pneumatic motor might replace the solenoid 20, switch 47 and tappet 48 in the case of the screen shown in Figures 4 and 5.

The motor comprises a cylinder 63, which is mounted on the frame member 64, and a piston 65 connected by the cross-bar 66 and rods 67 to the yoke 13 (supported, as before, by the spring leaves 14) and thus to the rods 10 and the second yoke 31. The cylinder 63 carries an adjusting screw 68 and hand-wheel 69 for the spring 70, which is interposed between the yoke 13 and the cylinder 63.

Compressed air is supplied through the pipe 71 and annular conduit 72 to the ports 73, and flows thence through the ports 74 in the piston 65 to the rear of the cylinder 63. The air pressure then drives the piston forward, which accordingly thrusts forward the table to which it is connected. It will be seen that after the piston 65 has moved forward a determinate distance, it covers the ports 73 and cuts off the supply of compressed air. The table and piston continue to move forward, owing to their momentum, until the rear of the piston 65 uncovers the exhaust ports 75, whereupon the compressed air in the cylinder escapes, and the pressure falls to atmospheric, or thereabouts. The return springs on the table and motor now cause the table and piston to return, covering the exhaust ports 75, and finally re-opening the inlet ports 73, whereupon compressed air is once more admitted to the cylinder, and the cycle is repeated.

It will be seen that the power supplied to the motor depends upon the length of time during which the inlet ports 73 are uncovered: the nearer the initial position of the piston 65 is to the back of the cylinder 63 (that is to say, towards the right hand side in Figure 11) the greater will be the time during which the inlet ports are open. Thus it will be seen that, with the inclined arrangement of the spring leaves which support the table, the piston is displaced further towards the right as the load on the table increases, and the power supply accordingly increases also.

Finally, Figure 12 shows diagrammatically an inertia governor for controlling the operation of the apparatus. For example, in the case of the arrangement shown in Figures 1, 2 and 3, the governor might be mounted on the rod 10 in place of the tappet 44, to operate the switch 43. As shown in Figure 12, the governor comprises a dash-pot cylinder 76 in which works a piston 77 mounted on a piston rod 78. Inside the cylinder 76 is a spring 79 urging the piston 27 away from the switch arm 45, and at the other end of the cylinder is a needle valve 80, by which the rate of travel of the piston 77 may be regulated. A bracket 81 is provided near the end of the return stroke of the governor as it is carried to and fro by the motion of the table, this bracket carrying a set-bolt 82 the end of which strikes the piston rod 78 at each stroke and returns piston 77 to the right hand end of the cylinder 76 against the action of the spring 79. The action of the device is as follows. When the piston 77 has been thrust to the right hand end of the cylinder 76 as just described and the return stroke of the table has commenced, the piston at once begins to move under the action of the spring 79. If the table is reciprocating comparatively slowly, as will be the case if it is heavily loaded, the piston will travel through a considerable part of its stroke before the table has travelled far enough towards the right to bring the right hand end of the rod 78 into contact with the arm 45. On the other hand, if the table is lightly loaded, and its natural time of oscillation is short, the piston 77 will have had little time to travel towards the left before the rod 78 strikes the arm 45. Thus, when the table is heavily loaded, the table performs a longer stroke before the rod 78 causes the switch arm 45 to operate than it does when the table is lightly loaded. The power supply accordingly increases and decreases with the load.

A similar arrangement may be employed for controlling a pneumatic motor. In this case, the cylinder 76 is mounted on the frame of the apparatus, and one end of the piston rod 78 is connected to an air control valve 78a shown in dotted lines in Fig. 12. The bracket 81 is mounted on the table, and serves to thrust the piston 77 towards the right (thus closing the air valve 78a) at each stroke of the table. It will here be seen that at each stroke of the table the air supply valve 78a is closed, and that it re-opens comparatively slowly until it is once more closed upon the return swing of the table. If the table is reciprocating rapidly, the air valve will have little time to open before it is re-closed, and the average opening of the valve is a small one; if, however, the table is reciprocating slowly, the air valve will have time to open widely before the re-closure takes place, and the average opening of the valve is a large one. It will thus be seen that the power supply is once more regulated in dependence upon the load on the table.

I claim:—

1. Vibratile apparatus comprising a plurality of flexible members which became strained in dependence upon the load imposed upon them, a table carried by said flexible members, motor means for reciprocating said table, regulating means for said motor means the position of said regulating means relatively to said table being dependent upon the amount of strain to which said flexible members are subjected, means for interconnecting said table and said regulating means to cause the latter to be actuated by the former in dependence upon their relative positions, a massive frame member supporting said flexible members, and pendulous supports for said frame member.

2. Apparatus for vibrating screens, concentrating tables, and like apparatus provided with a vibratable table on which is fed the material to be treated, comprising power means for reciprocating said table, means responsive to the load on the table, means for regulating the supply of power to the power means, said regulating means being controlled in dependence upon the condition of said responsive means, a massive member supporting said table and power means, and pendulous supports for said massive member.

3. Apparatus for vibrating screens, concentrating tables and like apparatus with a vibratable table on to which is fed the material to be treated, comprising a resilient support for said table responsive to the load on said table, a motor for vibrating said table, regulating means for controlling said motor, and actuating means connected to said table for actuating said regulating means in dependence upon the relative positions of said actuating means and said regulating means, said actuating means comprising a member supported at one end by said table and at its other end by resilient supporting means, whereby said actuating means can partake of the motions of the table.

4. Vibratile apparatus comprising a vibratable table, motor means for driving said table, regulating means for said motor means, resilient supports for said table of which supports the ends attached to the table are elastically displaced with respect to the regulating means in dependence upon the load on said table, interconnecting means which can partake of the motions of the table comprising a member supported at one end by said table and at its other end by resilient supports, said interconnecting means interconnecting said table and said regulating means to operate the latter when the table assumes a predetermined position in relation to the regulating means, and a frame member carrying said resilient supports.

5. Vibratile apparatus comprising a massive frame member, pendulous supports for said member, a plurality of inclined spring-leaves carried by said member, a table carried by said spring-leaves, at least one solenoid for reciprocating said table, a switch for controlling said solenoid, and a connecting member carried at one end by said table and at its other end by other spring-leaves carried by said massive frame member, whereby said connecting member can partake of the motions of the table, and controlling the closure of said switch for a length of time dependent jointly upon the initial deflection of said leaves and the excursion of the table from its mid position.

JOSEPH WILLIAM SHERWEN.